(12) United States Patent
Peercy et al.

(10) Patent No.: US 6,707,462 B1
(45) Date of Patent: Mar. 16, 2004

(54) METHOD AND SYSTEM FOR IMPLEMENTING GRAPHICS CONTROL CONSTRUCTS

(75) Inventors: Mark S. Peercy, Cupertino, CA (US); Thomas M. Olano, San Francisco, CA (US); John M. Airey, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/569,649

(22) Filed: May 12, 2000

(51) Int. Cl.$^7$ ................................................. G09G 5/00
(52) U.S. Cl. ....................................... 345/619; 345/418
(58) Field of Search ................................ 345/619, 625, 345/634, 676, 682, 422, 506, 419

(56) References Cited

U.S. PATENT DOCUMENTS

| | | | | |
|---|---|---|---|---|
| 4,967,392 A | * | 10/1990 | Werner et al. | 345/505 |
| 6,118,452 A | * | 9/2000 | Gannett | 345/418 |
| 6,229,553 B1 | * | 5/2001 | Duluk, Jr. et al. | 345/506 |
| 6,348,919 B1 | * | 2/2002 | Murphy | 345/421 |
| 6,578,197 B1 | | 6/2003 | Peercy et al. | |

OTHER PUBLICATIONS

Internship Report for Bryan O'Sullivan, "A graphical Editor for Stencil-based Application," Oct. 1993.*

Adam Levinthal and Thomas Porter, "Cjhap—A SIMD Graphics Processor, " pp. 77–82, ACM 1994.*

Cook, "Shade Trees", *Computer Graphics* (SIGGRAPH '84 Proceedings) 1984, 18(3), 223–231.

Fraser, et al., "Engineering a Simple, Efficient Code Generator", *ACM Letters on Programming Languages and Systems*, 1992.

Glidden, *Graphics Programming with Direct3D; Techniques and Concepts*, 1997, Microsoft Corp., Addision–Wesley Publishing Co.

Hanrahan, et al., "A Language for Shading and Lighting Calculations," *Computer Graphics*, 1990, 24(4), 289–298.

Perlin, "An Image Synthesizer,"*Computer Graphics*, 1985, 19(3), 287–296.

Upstill, "The Reader Man™ Companion, " 1990, Addision–Wesley Publishing Co.

Woo, et al., *OpenGL Programming Guide: The Official Guide to Learning OpenGL, Version1.1*, 1997, Silicon Graphics, Inc., Addision–Wesley Publishing Co.

* cited by examiner

*Primary Examiner*—John Cabeca
*Assistant Examiner*—Tadesse Hailu
(74) *Attorney, Agent, or Firm*—Woodcock Washburn LLP

(57) ABSTRACT

One aspect of the invention is a method for implementing a graphics control construct. The method includes the step of assigning by a graphics system interface (15) a value to at least one bit in a stencil buffer (S) in response to a first condition of a first conditional clause in an application program (11). The method also includes the steps of selecting at least a first portion of image data in response to the value, and processing the selected first portion of image data in a frame buffer (70) of a graphics pipeline (17).

17 Claims, 2 Drawing Sheets

METHOD AND SYSTEM FOR IMPLEMENTING GRAPHICS CONTROL CONSTRUCTS

TECHNICAL FIELD OF THE INVENTION

The present invention relates in general to image graphics and more particularly to a method and system for implementing graphics control constructs.

BACKGROUND OF THE INVENTION

Graphics rendering and other visualization applications typically utilize accelerated hardware, firmware, and in some cases software modules to perform compute-intensive rendering operations. These applications also utilize a graphics system interface such as OPENGL® or DIRECT3D® to control low-level graphics drawing operations in these accelerated modules. These operations include, but are not limited to, polygon specification and transformations, basic lighting control, and frame buffer operations such as blending and depth-buffering. Transformations usually correctly position one or more three-dimensional objects and then apply lighting and/or textures using the correct size and angles. OPENGL® utilizes a variety of low-level models such as textures, which may be defined for objects within scenes, and lighting models, which may define light sources and the manner in which surfaces in the scenes reflect light therefrom. Unfortunately, any increase in the quality of an object's appearance is typically associated with a decrease in processing speed. This decrease in processing speed is undesirable, especially for interactive applications.

Although these interfaces provide low-level models of graphics operations that may be performed by accelerated modules, they typically process geometry-based data, and thus limit the flexibility with which pixel-based complex effects may be programmed. For example, programmable or procedural shading applications usually involve pixel-based manipulation of the appearances of objects within a scene by an artist or technical director. Controlling the appearance of these objects typically requires the use of complex effects such as blending, shading and texturing. For example, the artist may desire that a portion of a reflecting pool appear rippled and bright. These applications are desirably programmable to improve the flexibility and speed of manipulating the objects to achieve the desired result. Unfortunately, these applications typically may not use graphics system interfaces such as OPENGL® in conjunction with conditional constructs so that only those selected pixels within a region will be affected as the artist desires.

SUMMARY OF THE INVENTION

From the foregoing, it may be appreciated that a need has arisen for providing a method for allowing software applications to utilize graphics pipelines to flexibly and easily alter the appearances of image objects. In accordance with the present invention, a method and system for implementing graphics control constructs are provided that substantially eliminate or reduce disadvantages and problems of conventional systems.

One aspect of the invention is a method for implementing a graphics control construct. The method includes the step of assigning by a graphics system interface a value to at least one bit in a stencil buffer in response to a first condition of a first conditional clause in an application program. The method also includes the steps of selecting at least a first portion of image data in response to the value, and processing the selected first portion of image data in a frame buffer of a graphics pipeline. The invention provides several important advantages over conventional systems. Various embodiments of the invention may have none, some, or all of these advantages. For example, one technical advantage of the present invention is that it may be used to implement conditional statements using a graphics system interface in conjunction with accelerated processing. This advantage allows an interface such as OPENGL® to be used as a single-instruction, multiple-data (SIMD) computing surface. Such an advantage may allow per-pixel computations to be evaluated so that different functions, such as texturing and shading, may be applied to selected regions, rather than on a rectilinear basis typically required by conventional systems. Such an advantage may improve the quality of the resultant shading and/or appearance. Another technical advantage of the present invention is that it may be used with a variety of existing systems with little or no impact on the speed of processing. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, and in which.

DETAILED DESCRIPTION OF THE INVENTION

Figure 1:
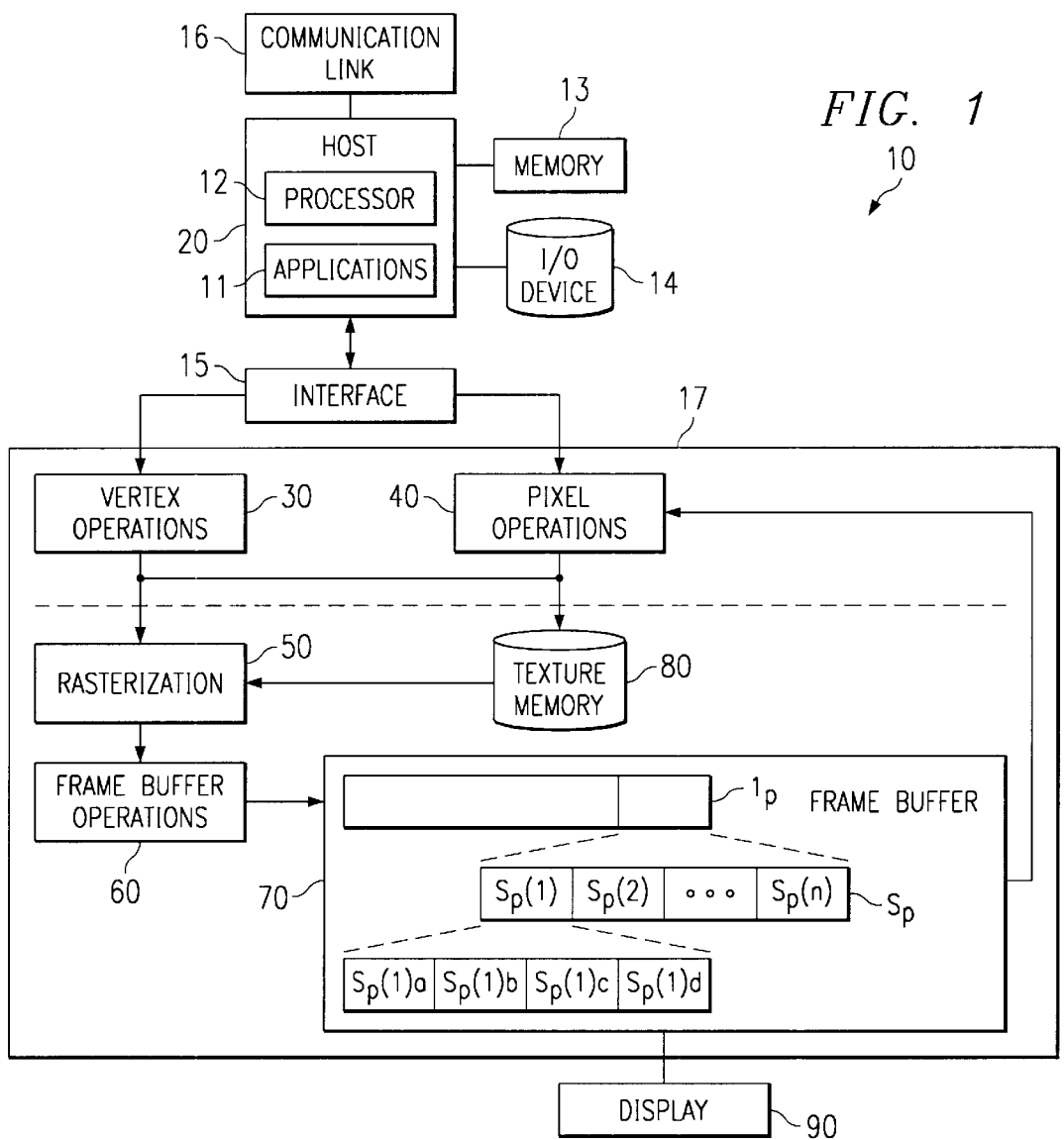
FIG. 1 is a block diagram of a graphics system.

FIG. 1 is a block diagram of a graphics system 10. Graphics system 10 includes a host 20 coupled to a graphics system interface 15 which couples to a graphics pipeline 17. Host 20 may be a general or a specific purpose computer and includes a processor 12 and a memory 13, which may include random access memory (RAM) and read only memory (ROM). Specifically, host 20 may be used to execute applications 11 having image graphics and visualization software that may be stored in memory 13 and/or an input/output device 14. Results may be displayed using display 90 and/or stored in input/output device 14, which may be any suitable storage medium. Data processing may be performed using special purpose digital circuitry contained either in host 20 or in a separate device. Such dedicated digital circuitry may include, for example, application-specific integrated circuitry (ASIC), state machines, fuzzy logic, as well as other conventional circuitry. Host 20 may also include a portion of a computer adapted to execute any of the well known MS-DOS, PC-DOS, OS2, UNIX, MAC-OS, and Windows operating systems or other operating systems including nonconventional operating systems. Host 20 may also be coupled to a communication link 16 that may be connected to a computer network, a telephone line, an antenna, a gateway, or any other type of communication link.

Interface 15 may be any software graphics or firmware interface such as OPENGL® or DIRECT3D® that includes procedures and functions and that may be used to control low-level operations in graphics pipeline 17. In operation, interface 15 is operable to control the processing of image data in graphics pipeline 17 in response to selected commands that are passed from application software 11 such as a programmable shader. Data is passed through some or all of the elements in graphics pipeline 17 and may then be transferred from frame buffer 70 to display 90 for viewing. For example, pixels may be written to and read from frame buffer 70 using OPENGL® function calls such as the DrawPixels and ReadPixels command, and the function CopyPixels can be used to copy a block of pixels from one region of frame buffer 70 to another.

More specifically, graphics pipeline 17 includes a vertex operations module 30 and a pixel operations module 40. Vertex operations module 30 and pixel operations module 40 are each coupled to a rasterization hardware 50. Rasterization hardware 50 is coupled to a frame buffer operations module 60, which in turn is coupled to a frame buffer 70. Frame buffer 70 may couple to pixel operations module 40. Pixel operations module 40 is also coupled to a texture memory 80, which is also coupled to rasterization hardware 50. Graphics pipeline 17 may include software, firmware, hardware, or a combination thereof. Interface 15 may be a standalone module, reside on host 20, or a combination thereof.

It may be helpful to illustrate a single pass through graphics pipeline 17. Because interfaces 15 such as OPENGL® are procedurally based, graphics pipeline 17 performs those low-level operations on all of the pixels passed in response to the OPENGL® procedure or function call. Host 20 sends image data to pixel operations module 40, which may utilize a lookup table to apply a scale or bias such as a color contrast or brightness to pixels passed thereto. Host 20 also sends geometry data to vertex operations module 30. The geometry data usually includes texture coordinates or vertices (s,t,r,q) that are projected points that correspond to a location (x,y,z,w) in an image plane. The geometry data may also include normals at each of these vertices for each of the three channels (usually red, green, and blue). Vertex operations module 30 transforms geometry into a raster coordinate system. Usually, this includes tessellation, or breaking down a continuously smooth surface into triangular surfaces. Rasterization hardware 50 usually interpolates the tessellated vertices to populate the pixels within each of these surfaces. In some applications, rasterization hardware 50 may also request a texture map from texture memory 80 which is then applied to all of the pixels in rasterization hardware 50. These pixels are then passed to frame buffer 70.

Frame buffer operations module 60 then may perform a variety of functions on the data passed from rasterization hardware 50 and then pass this data to frame buffer 70. When frame buffer 70 has performed any or all of these operation on all of the pixels, the pixels are usually sent to a display 90. Some of these functions include, but are not limited to, a depth test, blending, and a stencil test, and are performed on all of the pixels passed to frame buffer operations module 60. A depth test typically discards portions of an image region that fail a depth comparison; For example, the depth test may be used to clip surfaces that are further from, or are obstructed by, an object that is nearer in a field of view. Blending usually includes operations that may be performed on the pixels in the frame buffer, such as adds, subtracts, multiplies, or clears, and is typically used when assigning color values to pixels. An operation may be performed for each of the three color channels.

A stencil test may be used as an arbitrary comparison that allows selected pixels to be rejected based on the outcome of a comparison per pixel between the value in a stencil buffer and the reference value, usually an integer. A stencil buffer S maskline includes n stencil values $Sp(1), Sp(2), \ldots, Sp(n)$, where n is the total number of pixels in frame buffer 70. Thus, stencil buffer $S_p$ includes 512 stencil values for a portion of an image $I_p$ that includes 512 pixels in frame buffer 70. Each of stencil values $S_p(1)$–$S_p(n)$ may include four bits, depending on system 10 requirements. For example, stencil value $S_p(1)$ includes four bits $S_p(1)a$–$d$, from a least significant bit to a most significant bit.

Where programmable applications 11 such as shading algorithms are used to model the appearance of objects, an artist typically describes the appearance of one or more portions of an image by selecting those pixels that should be altered. For example, a programmable shading algorithm may be used to provide various atmospheric, light, shading, surface details, textures, and/or colors. These functions may parameterize the appearance of selected objects.

These complex appearance effects typically result in different operations being performed on each resultant geometry-based vertex. One example may be a three-D lighting operation that models the diffuse reflection of colored, directional light sources from colored surfaces. Algorithms may use an illumination function that calculates the diffuse reflection of colored directional light for each vertex of a colored surface. For example, the illumination function for a single vertex is a vector dot product of the light source coordinates and the vertex normal, multiplied by the light color, the vertex material color, and the attenuation.

Application software 11 may reside on host 20 or may be a separate module. Any data upon which application software may operate, including scenes and any objects therein, may be referred to as image data. This image data may originate from memory in host 20 or in a separate storage medium (not explicitly shown). Application software 11 and image data residing on host 20 are used to illustrate one aspect of the invention. Interface 15 may couple host 20 to graphics pipeline 17 in some embodiments or couple a separate application program 11 to host 20 in others.

Application 11 may process one or more pixel-based portions of an image for a given geometry-based vertex by passing selected portions of image data through graphics pipeline 17 multiple times with different parameters. This allows interface 15 such as OPENGL® to be used as a single-instruction multiple data (SIMD) computing surface by using several basic OPENGL® functions in multi-pass operations that are called by conditional statements in application 11 for selected pixels. That is, performance of operations is limited to those pixels that pass or satisfy the condition. Details for translating a shading language such as RenderMan into multiple passes through a graphics pipeline 17 driven by a graphics interface 15 such as OPENGL® may be found in co-pending U.S. patent application Ser. No. 09/056,683, entitled "System and Method for High-Speed Execution of Graphics Application Programs Including Shading Language Instructions", filed Apr. 8, 1998.

These conditional statements include a variety of control constructs that are typically used in a variety of programming languages such as the RenderMan shading language. These statements include, but are not limited to, if . . . else, for . . . while, and do . . . while pairs. Each of these statements may include conditions that are as simple or as complex as needed to achieve the desired appearance. Each of these statements may also include additional functions and operations that may be nested within the pair, including additional nested conditional statements.

Figure 2:
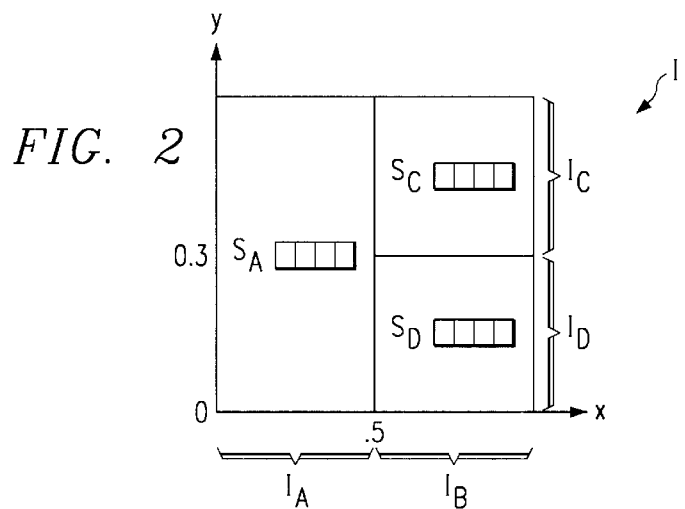
FIG. 2 graphically illustrates an example of an image that may be processed.

FIG. 2 graphically illustrates an example of image data that may be processed by system 10. Image I may be any scene or object therein, and includes a plurality of pixels along an x and y axis, where x and y represent values that may be used in the image processing operations discussed below. Image I includes rectilinear portions $I_A$–$I_D$. As illustrated, portion IA includes all image pixels where x is less than 0.5. Similarly, portion $I_B$ includes all pixels where x is greater than or equal to 0.5. Portion $I_C$ includes all of the image pixels where y is >0.3 and x is ≧0.5, and portion $I_D$ includes all pixels where y is ≦0.3 and x is ≧0.5. A stencil buffer value applies to all of the pixels within an image I or portion thereof to be processed in graphics pipeline 17. Although stencil buffer S is typically used for the plurality of pixels within frame buffer 70, for convenience four-bit stencil buffer values $S_A$, $S_C$, and $S_D$ are illustrated for a single pixel for each of the corresponding portions $I_A$, $I_C$, and $I_D$ and may be assigned using the methods discussed below. That is, stencil buffer values $S_A$, $S_C$, and $S_D$ represent values for selected pixels of image I derived during processing of corresponding clauses A, C, and D in the methods discussed below, and typically do not co-exist. The invention contemplates the use of portions $I_A$–$I_D$ that are not rectilinear, whose shapes may be processed in one or more passes through graphics pipeline 17.

Figure 3:
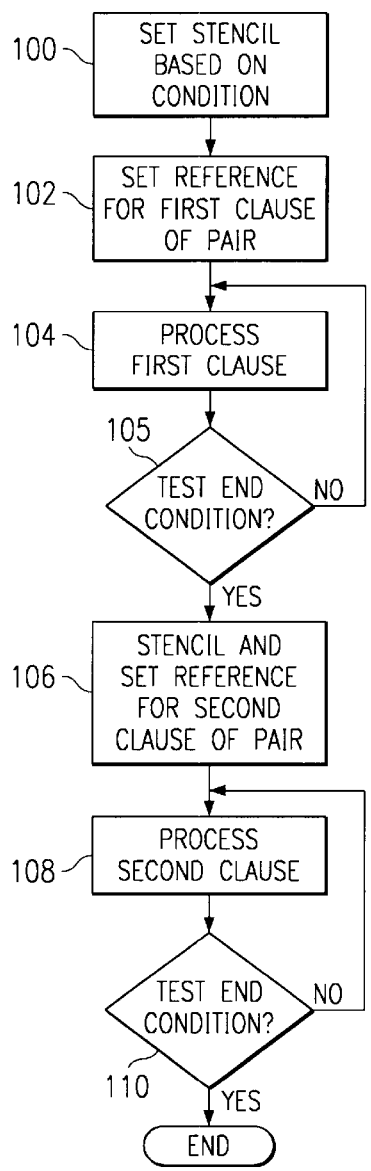
FIG. 3 illustrates an example of a method for implementing a graphics control construct.

FIG. 3 illustrates an example of a method for implementing graphics control constructs. In this embodiment, a stencil bit in the stencil buffer S may be set based on a conditional nesting level. Although steps 100–110 are illustrated as separate steps, various steps may be ordered in other logical or functional configurations, or may be performed as single steps. The image I illustrated and discussed in conjunction with FIG. 2 may be used to illustrate one aspect of the invention.

The method may be performed by using at least one bit in stencil buffer S for number and/or type of conditionals, and for a variety of operations. By way of example and not by limitation, these operations may be complex, multi-step operations such as sin(x*y), or simple operations such as a color assignment to red. Image I may be processed using graphics pipeline 17 in a SIMD configuration using an application 11 such as the Rendermnan shading language. The following pseudocode fragment may be exemplary of the conditional statements used by an application 11, and may be used to illustrate the method:

```
if     {(x < 0.5)                                                       (A)
            perform operation #1 - give selected portion a smooth
            appearance}
       }
else   {-- give selected portion a bright rippled appearance            (B)
            {if (y > 0.3)                                               (C)
            {perform operation #2 - give selected portion a bright
            appearance}
            else                                                        (D)
            perform operation #3 - give selected portion a dark appearance
            }
```

The above pseudocode illustrates two levels of nesting. That is, a single second control construct resides internal to at least one portion of the first control construct. For example, the first level of nesting is denoted by the "if" clause labeled "A" (if clause A) and the "else" clause labeled "B" (else clause B) and their respective operations (the first if . . . else pair A-B). The second level of nesting is denoted by if clause C and else clause D and their respective operations (the second if . . . else pair C-D). Two levels of nesting might also be demonstrated where another single control construct resides internal to if clause A. On the other hand, a third level of nesting is added where a single control construct resides internal to the second nesting level (the second if . . . else pair C-D). Because procedural shaders are fully user-programmable, there may be an arbitrary number of nested control structures such as if . . . else, while . . . for constructs. Thus, further levels of nesting may be similarly added and are also within the scope of the invention.

The method begins in step 100, where a value is assigned to a first stencil bit of stencil buffer S in response to a first condition in a first clause. For example, and the first clause may be if clause A. The result of a stencil test indicates whether selected pixels pass or fail a selected condition, and thus the value may desirably be set to "true" or one (1), or "false" or zero (0). The condition may be selected using a variety of methods, and may depend on the application. For example, stencil buffer S may pass those data values where x>0.5 or x−0.5>0, or fail for those values where x<0.5.

The method continues in step 102, where a reference value is set in response to the value selected in step 100. The reference value is constant for all pixels within the object to which stencil buffer S is compared. Thus, the first stencil bit may be assigned a value one (1) in response to whether x is >0.5. As one example, the reference may act as a mask that is set to one for those data values where x<0.5, and that is set to zero for all other data values. The pixels that are passed may be graphically illustrated as portion IA as illustrated in FIG. 2, which includes all image data where x<0.5. For example, if a reference value is set to pass the first least significant bit in stencil buffer S for pixels passing the condition x>0.5, depending on values within stencil buffer S and the reference used, the first bit within stencil buffer value $S_A$=1.

Then, in step 104, the image data is processed. In the example discussed above, operation #1 is performed on those image data for all pixel values where x<0.5 using a second pass through graphics pipeline 17. For example, those image data within portion $I_A$ as may be given a smooth appearance.

Because the reference value is constant for all pixels to which the stencil is compared, in step 105 the method may also test for an end condition at the end of each pass. This end condition may be used with a variety of conditional statements including "for . . . while" constructs to test whether, for all pixels, the condition is still true. For example, the method may use OPENGL®'s CopyPixel with minmax turned on. The minmax function outputs the minimum and maximum values for red, blue, green, and alpha pixel values for a selected region of pixels. The method then queries whether all pixels have been processed by testing one of the minimum or maximum values is equal to a known constant, such as zero.. If not, the method returns to step 104. In this example, where the minimum pixel value=0= the maximum pixel value, this step ensures that all pixels have been disabled and the control construct has been completed.

The method continues in step 106, where a value is assigned to the first stencil bit in response to a second condition in a second clause. Here, the second clause may be else clause B. Thus, the stencil test may also be set to fail all pixels in response to the condition x<0.5, or to pass all pixels where x≧0.5. The method continues in step 108, where a reference is set in response to the second clause. Similarly, the pixels that are passed may be graphically illustrated as portion $I_B$ as illustrated in FIG. 2. For example, if the stencil value used is set to pass all pixels where $x \geq 0.5$, the first bit within stencil buffer value $S_A=0$, $S_C=1$, and $S_D=1$, and no pixels within image portion $I_A$ will be selected. In some applications, where the number of stencil bits may be small relative to the number of nested levels, the reference mask may be used instead of or in combination with, the value selected for stencil buffer S.

Then, in step 108, the image data is processed. In the example discussed above, the operation is performed on those image data where $x \geq 0.5$. In this example, the operation is a nested "if . . . else" combination denoted by if clause C and else clause D and their respective operations.

The method may then be repeated for this nested if . . . else operation C-D using a next bit in the stencil buffer. This next bit of the stencil buffer may be assigned in response to a first condition in a first nested clause, here the condition y>0.3 in if clause C. A reference is set in response to the first clause, such as passing those pixels where y>0.3. Thus, the four bits within stencil buffer value $S_C$ may be=1, 1, 0, and 0, representing the pixel portions passed where y>0.3 and those included where x>0.5. Then the image data is processed in this example by performing operation #2 using graphics pipeline 17 on portion $I_C$ as illustrated in FIG. 2, where x is not <0.5 and y>0.3. Using the example above, those image data may be assigned a bright appearance. The same bit of the stencil buffer may be assigned in response to the condition in the next nested clause, else clause D. The image data is processed in this example by performing operation #3 on portion $I_D$ where x is not <0.5 and y is not >0.3, as illustrated in FIG. 2. Using the example above, those image data may be assigned a dark appearance, and the four bits within stencil buffer value $S_D$ may be=1, 0, 0, and 0.

In step 110 the method may also test for an end condition at the end of this clause, as is discussed above. If the clause has not been completely processed, the method returns to step 108. If so, the method ends. The method may also be repeated for any number of nested clauses, using a new bit for each level of nesting as described in conjunction with steps 100–108. In addition, the method contemplates the use of any clause as a first clause, including nested clauses, and/or the inversion of the test as described for an if . . . else construct. That is, the method may designate else clause B as the first clause, and if clause A as the second clause.

Moreover, any convention may be used for passing and/or excluding the desired pixels based on the condition. For example, it may be desirable to set the reference to pass, rather than exclude, data values based upon a condition in a first clause (e.g., if clause A, where x<0.5), and the first nested clause (e.g., clause C, where y>0.3). To illustrate, bits within stencil buffer S for those pixels which satisfy these conditions=1. In this example, values for two of the four bits within $S_A$ may be=1 and 0; values for two of the four bits within $S_C$ may be=0 and 1; and values for two of the four bits within $S_D$ may be=0 and 0. On the other hand, the reference may be set to exclude data values based upon a condition in the first clause A and the first nested clause C. To illustrate, bits within stencil buffer S for those pixels which satisfy either of these conditions=0. Thus, for the same if clause C, values for two of the four bits within $S_A$ may be 0 and 1; for $S_C$ may be=1 and 0; and for $S_D$ may be=1 and 1.

The method may also include utilizing a mechanism such as the alpha channel of frame buffer 70 to select or exclude any portion or region of pixels as desired. The alpha channel typically passes one to three color values and is typically used for blending operations to indicate the transparency of one or more of these colors. The alpha channel may also be used in combination with an alpha test to perform per pixel exclusions and to circumvent any implementation-specific requirements imposed on textures by procedures in interface 15, such as any rectilinear requirements imposed by OPENGL®. An alphatest may be controlled by using an AlphaFunc call to discard portions of an image conditional on the outcome of a comparison between the incoming portion's alpha value and a constant value. For example, a desired region may be selected by evaluating the condition as discussed above and then passing those pixels in the alpha channel that satisfy the condition. The result provides a number of values (e.g., 1's and 0's) in the alpha channel that may be used as a mask. For example, these values in the alpha channel may then be copied back to the alpha channel using OPENGL®'s CopyPixel function with alphatest enabled, thus removing those pixels that fail the condition while leaving those pixels that satisfy the condition (the selected pixels). The selected pixels are thus copied into the alpha channel and may activate the stencil bit. This process may be used in several passes through graphics pipeline 17 to build up the result in the alpha channel (more generally in frame buffer 70). More generally, any color channel may be used to set a color, and then these pixel values may be copied to the alpha channel.

Figure 4:
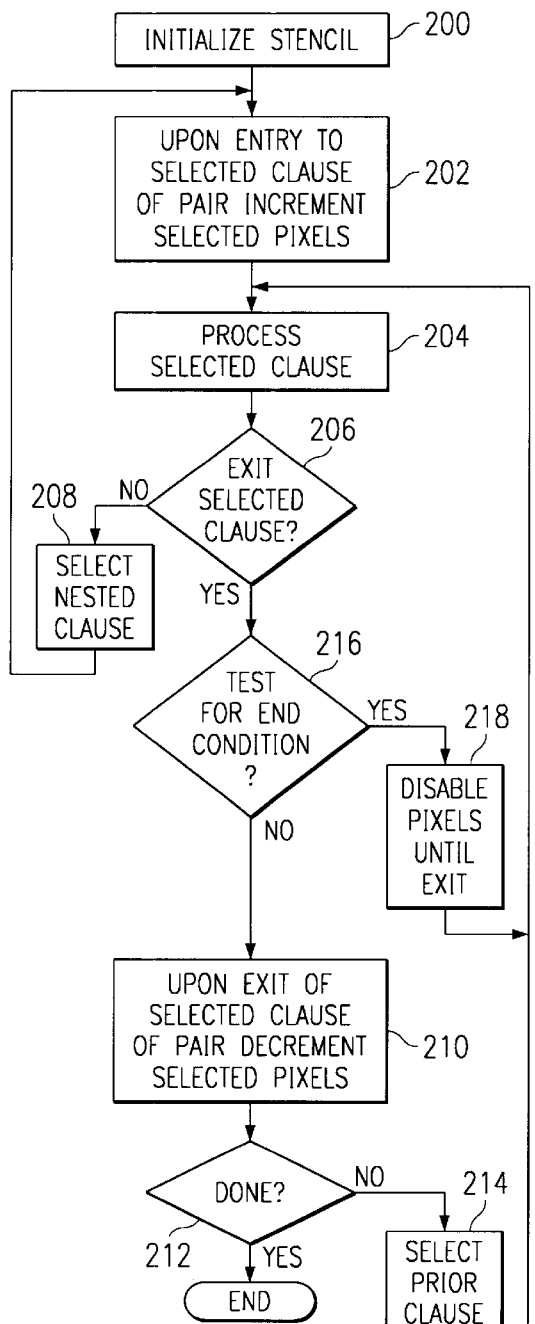
FIG. 4 illustrates another example of a method for implementing a graphics control construct.

FIGURE 4 illustrates another example of a method for implementing graphics control constructs. This example may be particularly advantageous where, for example, the number of stencil bits available may be small relative to the number of nested control construct levels. Although steps 200–218 are illustrated as separate steps, various steps may be ordered in other logical or functional configurations, or may be performed as single steps. The method may be performed using at least one bit in a stencil buffer for any number and/or type of conditionals, and for a variety of operations. Image I and the pseudocode fragment illustrated and discussed in conjunction with FIGS. 2 and 3, respectively, may be used to illustrate one aspect of the invention. Image I may be processed using graphics pipeline 17 in a SIMD configuration using an application 11 such as the RenderMan shading language.

Rather than using one bit per level of nesting, a stencil buffer count or value may be used to indicate the depth of nesting within each control construct. This count may be maintained in the stencil bit, and then incremented and/or decremented therein. This embodiment of the invention may efficiently utilize n stencil bits, up to $2^n$ level of nesting. For example, only four stencil bits need be used for sixteen nested levels, and eight bits can accommodate up to 256 levels of nesting. In some applications, it may be desirable for pixels whose stencil buffer values are nonzero to participate in the rendering, and to increment the value of those pixels. This convention is used to illustrate one aspect of the invention.

The method begins in step 200, where the stencil bits are initialized, in this case to zero. Upon entry in step 202 to a first clause, a reference value is set in response to the first clause, as was discussed in conjunction with FIG. 2. The stencil buffer values for those pixels that pass the stencil test (the selected pixels) are incremented. The stencil test may be performed using the techniques described above in conjunction with FIG. 3. In this embodiment, stencil buffer values, rather than bits, are compared. Thus, those values that fail are assigned to a stencil buffer value of zero, and those that pass are assigned a stencil buffer value of one. Any clause may be selected as the first clause. Clause B of the A-B pair will be used to simplify illustration of the method.

Then, in step 204, the image data is processed. In the example discussed above, the operation is performed on those image data where x≧0.5. In this example, the operation is the nested "if . . . else" combination C-D. The method then continues in steps 206 and 208 to process this selected nested if . . . else operation C-D. The stencil buffer value may be incremented for selected pixels in step 202 in response to a first condition in a first nested clause, here the condition y>0.3 in if clause C. The method may continue in this way where at each next level of nesting, the stencil buffer value is incremented for selected pixels. In addition, an alphatest or reference mask may be used in conjunction with the stencil test to increment selected regions. In both embodiments, the stencil buffer value used represents which level of nesting and which pixels are active.

If in step 206 the method determines that it will be exiting a clause, the method proceeds to step 210, where the stencil buffer values for the selected pixels (passed or failed) by the stencil test may be decremented. In step 212, the method is done if all of the clauses have been processed and the method ends. If not, the method continues to step 214 where the prior clause is selected so that it may be further processed in step 204.

Because the reference value is constant for all pixels to which the stencil is compared, in step 216 the method may also test for an end condition at the end of each pass, as was discussed in conjunction with FIG. 3. This end condition be used with a variety of conditional statements including "for . . . while" constructs to test whether, for all pixels, the condition is still true. In this embodiment, the method may utilize a variety of methods in step 218 to maintain its position and to disable selected pixels in the nested level. For example, the method may increment the stencil buffer value once for the pixels that were active upon entry to the selected clause and a second time for the pixels that are currently actively being processed in the selected clause. Where those pixel values of zero participate in the rendering process, this process initializes the stencil buffer value to a non-zero value, disabling the pixels until the nested level has been exited.

A variety of conventions may be used to implement this embodiment of the method. For example, it may be desirable in some applications to utilize a convention where only those pixels whose stencil buffer values are non-zero participate in the rendering process. Thus, where each time a first clause of a pair is entered, the stencil buffer value of participating pixels is incremented. To illustrate the method after pseudocode clause C has been processed, values for two of the four bits within $S_A$ may be 0 and 0; for $S_C$ may be=1 and 0; and for $S_D$ may be=0 and 1. That is, stencil buffer values $S_C$ =2, $S_D$=1, and $S_A$=0. Thus, only pixels with the highest stencil buffer value two (2) may be processed. This convention may be advantageous, because other computations may be performed by system 10 on the portions passed with these stencil bits activated (enabled). Such an advantage may reduce the number of passes through graphics pipeline 17 required to perform multiple operations.

In other applications, it may be desirable to utilize a convention where those pixels with stencil buffer values of zero participate in the rendering process. Using such a process, each time a first clause of a pair is entered, the stencil buffer value of non-participating pixels is incremented. In this case, stencil buffer values as processed in clause C may be $S_A$=2, $S_C$=0, and $S_D$=1.

Other equivalent methods may also be used. For example, it may be desirable to reduce the number of bits that may be required for assigning the stencil buffer values by decrementing or reassigning the stencil bit if its value is greater than one. Two methods may include, but are not limited to, incrementing each of the applicable values and then resetting those values that are greater than two back to one, or by decrementing each value of two back to one. This advantage may also reduce the number of alpha comparisons that may be performed.

A discussion of procedural calls that may be used in application 11 to implement a basic if . . . else construct where interface 15 uses OPENGL® technology may be illustrative. For example, when entering if clause A, the condition may be evaluated using the alpha channel by the following OPENGL® commands, assuming that values of zero participate in the rendering process:

//s=(a==0?s+1:s)

glAlphaFunc(GL$_{13}$ EQUAL,0);

glStencilFunc(GL$_{13}$ ALWAYS,0,0);

glStencilOp(GL$_{13}$ INCR,GL$_{13}$ INCR,GL$_{13}$ INCR);

Then, for else clause B the following commands may be used:

//s=(s<2?!s:s)

glStencilFunc(GL__LESS,2,0xff);

glStencilOp(GL__INVERT,GL__KEEP,GL__KEEP);

glStencilMask(0x1);

Upon leaving the if . . . else construct, the pixels may be cleared and decremented:

//s=(s>0?s−1:s)

glStencilFunc(GL__GREATER,0);

glStencilOp(GL__KEEP,GL__DECR,GL__DECR);

In some applications, else clauses may require at least two passes to decrement or increment a stencil buffer value from a prior clause and to mask the stencil buffer value for the else clause. The increased processing time may result in a texture that may be displayed at a desired frame rate that is reduced in resolution. Thus, the method may streamline the processing of the conditional constructs in application 11 by utilizing a convention where there are, for example, no else clauses in the control construct. For example, the method may always process an if clause as a first clause, and process any else clauses as a separate if clause using an inverted condition, stencil, or reference value.

Thus, it is apparent that there has been provided in accordance with the present invention, a system and method for implementing graphics control constructs that satisfies the advantages set forth above. For example, the present invention allows the use of conditional statements to be used in a programmable application with a graphics system interface such as OPENGL®. That is, a graphics system interface may be used as a general SIMD computing surface, where a single instruction processes multiple data elements simultaneously. Thus, for example, one instruction may be performed for each pixel loaded into a frame buffer. This flexibility may allow complex effects to be programmed using functions such as procedural shaders and may improve the appearance of objects within scenes. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method for implementing a graphics control construct, comprising:
    assigning a value to a first bit in a stencil buffer used by a graphics system interface in response to a first condition of a first conditional clause in an application program;
    selecting a first portion of image data in response to the value; and
    processing the selected first portion of image data in a frame buffer of a graphics pipeline;
    assigning a value to a second bit in the stencil buffer in response to a first condition of a second conditional clause in the application program, the second conditional clause nested within the first conditional clause;
    selecting a second portion of image data in response to the value assigned to the second bit; and
    processing the selected second portion of image data in the frame buffer.

2. The method of claim 1, wherein assigning the value to the first bit includes one of the group consisting of decrementing the value and incrementing the value.

3. The method of claim 1, wherein the first conditional clause is operable to perform the function of one of the group consisting of an if clause, an else clause, a for clause, a while clause, and a do clause.

4. The method of claim 1, wherein selecting the first portion includes utilizing an alpha channel of the graphics pipeline.

5. A method for implementing a graphics control construct, comprising:
    assigning a value to at least one bit in a stencil buffer used by a graphics system interface in response to a first condition of a first conditional clause in an application program;
    selecting at least a first portion of image data in response to the value;
    processing the selected first portion of image data in a frame buffer of a graphics pipeline; and
    testing an end condition of the first conditional clause by determining whether one of the group of a minimum value and a maximum value is equal to a known constant.

6. An application for implementing a control construct, comprising:
    a computer-readable medium; and
    software residing on the computer-readable medium, the software operable to:
        assign a value to a first bit in a stencil buffer used by a graphics system interface in response to a first condition of a first conditional clause;
        assign a value to a second bit in the stencil buffer in response to a first condition of a second conditional clause nested within the first conditional clause;
        select a first portion of image data in response to the value;
        cause the selected first portion of image data to be processed in a frame buffer of a graphics pipeline;
        select a second portion of image data in response to the value assigned to the second bit; and
        cause the selected second portion of image data to be processed in the frame buffer.

7. The application of claim 6, wherein the first conditional clause is operable to perform the function of one of the group consisting of an if clause, an else clause, a for clause, a while clause, and a do clause.

8. The application of claim 6, wherein the software is operable to assign the value by one of the group consisting of decrementing the value and incrementing the value.

9. The application of claim 6, wherein the software is further operable to select utilizing an alpha channel of the graphics pipeline.

10. An application for implementing a control construct, comprising:
    a computer-readable medium; and
    software residing on the computer-readable medium, the software operable to;
        assign a value to at least one bit in a stencil buffer used by a graphics system interface in response to a first condition of a first conditional clause;
        select at least a first portion of image data in response to the value; and
        cause the selected first portion of image data to be processed in a frame buffer of a graphics pipeline; and
    test an end condition of the first conditional clause by determining whether one of the group of a minimum value and a maximum value is equal to a known constant.

11. The application of claim 10, wherein the graphics system interface is operable to perform at least a subset of the functions of those performed by the graphics system interface sold under the trademark OPENGL®.

12. A system for implementing a control construct, comprising:
    a graphics system interface;
    a graphics system host coupled to the graphics system interface; and
    an application program resident on the host, the application program operable to:
        assign a value to a first bit in a stencil buffer used by the graphics system interface in response to a first condition of a first conditional clause and select a first portion of image data in response to the value, cause the selected first portion of image data to be processed in a frame buffer of a graphics pipeline coupled to the host;
        assign a value to a second bit in the stencil buffer in response to a first condition of a second conditional clause nested within the first conditional clause and select a second portion of image data in response to the value assigned to the second bit; and
        cause the selected second portion of image data to be processed in the frame buffer.

13. The application of claim 12, wherein the first conditional clause is operable to perform the function of one of the group consisting of an if clause, an else clause, a for clause, a while clause, and a do clause.

14. The system of claim 12, wherein the application program is operable to assign the value by one of the group consisting of decrementing the value and incrementing the value.

15. The system of claim 12, wherein the application program is further operable to select utilizing the alpha channel of the graphics pipeline.

16. A system for implementing a control construct, comprising:
    a graphics system interface;
    a graphics system host coupled to the graphics system interface; and an application program resident on the host, the application program operable to:
- assign a value to at least one bit in a stencil buffer used by the graphics system interface in response to a first condition of a first conditional clause and select at least a first portion of image data in response to the value;
- cause the selected first portion of image data to be processed in a frame buffer of a graphics pipeline coupled to the host; and
- test an end condition of the first conditional clause by determining whether one of the group of a minimum value and a maximum value is equal to a known constant.

17. The system of claim 16, wherein the graphics system interface is operable to perform at least a subset of the functions of those performed by the graphics system interface sold under the trademark OPENGL®.

* * * * *

UNITED STATES PATENT AND TRADEMARK OFFICE
CERTIFICATE OF CORRECTION

PATENT NO. : 6,707,462 B1
DATED : March 16, 2004
INVENTOR(S) : Peercy et al.

It is certified that error appears in the above-identified patent and that said Letters Patent is hereby corrected as shown below:

Column 2,
Line 4, after "graphics pipeline.", there should be a new paragraph.

Column 4,
Lines 5-6, delete "Sp(1), Sp(2), ..., Sp(n)" and insert therefor -- $S_p(1), S_p(2), ..., S_p(n)$ --.

Column 6,
Line 57, after "such as zero" delete ".." and insert therefor -- . --.

Column 10,
Line 17, delete "//s=(a= =0?s+1:s) and insert therefor -- //s=(a= = 0?s+1:s) --.
Line 18, delete "($GL_{13}$EQUAL,0);" and insert therefor -- (GL_EQUAL,0); --.
Line 19, delete "($GL_{13}$ALWAYS,0,0);" and insert therefor -- (GL_ALWAYS,0,0); --.
Line 20, delete "($GL_{13}$INCR,$GL_{13}$INCR,$GL_{13}$INCR);" and insert therefor
-- (GL_INCR,GL_INCR,GL_INCR); --.

Signed and Sealed this

Thirteenth Day of July, 2004

JON W. DUDAS
*Acting Director of the United States Patent and Trademark Office*